(12) United States Patent
Gulsun et al.

(10) Patent No.: US 9,881,372 B2
(45) Date of Patent: *Jan. 30, 2018

(54) METHOD AND SYSTEM FOR VASCULAR DISEASE DETECTION USING RECURRENT NEURAL NETWORKS

(71) Applicant: Siemens Healthcare GmbH, Erlangen (DE)

(72) Inventors: Mehmet A. Gulsun, Lawrenceville, NJ (US); Yefeng Zheng, Princeton Junction, NJ (US); Puneet Sharma, Monmouth Junction, NJ (US); Bogdan Georgescu, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/680,584

(22) Filed: Aug. 18, 2017

(65) Prior Publication Data

US 2017/0372475 A1 Dec. 28, 2017

Related U.S. Application Data

(63) Continuation of application No. 15/429,806, filed on Feb. 10, 2017, now Pat. No. 9,767,557.
(Continued)

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4604* (2013.01); *G06N 3/02* (2013.01);
(Continued)

(58) Field of Classification Search
CPC ..... G06T 7/0012; G06T 7/60; G06T 2200/04; G06T 2200/10081; G06T 2200/20084;
(Continued)

(56) References Cited

U.S. PATENT DOCUMENTS 5,710,830 A * 1/1998 Holeva ...................... F24C 7/06
358/464
6,285,992 B1 * 9/2001 Kwasny ............... G06K 9/6267
706/15
(Continued)

OTHER PUBLICATIONS

Medonica, Ana Maria; et all; "Segmentation of retinal blood vessels by combining the detection of centerlines and morphological reconstruction"; IEEE transactions on medical Imaging Sep. 25, 2006; pp. 1200-1213.
(Continued)

*Primary Examiner* — Shefali Goradia

(57) ABSTRACT

A method and apparatus for vascular disease detection and characterization using a recurrent neural network (RNN) is disclosed. A plurality of 2D cross-section image patches are extracted from a 3D computed tomography angiography (CTA) image, each extracted at a respective sampling point along a vessel centerline of a vessel of interest in the 3D CTA image. Vascular abnormalities in the vessel of interest are detected and characterized by classifying each of the sampling points along the vessel centerline based on the plurality of 2D cross-section image patches using a trained RNN.

26 Claims, 11 Drawing Sheets

Related U.S. Application Data

(60) Provisional application No. 62/353,888, filed on Jun. 23, 2016.

(51) Int. Cl.
  *G06N 3/02* (2006.01)
  *G06T 7/60* (2017.01)
  *G06K 9/46* (2006.01)

(52) U.S. Cl.
  CPC ............ *G06T 7/60* (2013.01); *G06T 2200/04* (2013.01); *G06T 2207/10081* (2013.01); *G06T 2207/20084* (2013.01); *G06T 2207/30101* (2013.01)

(58) Field of Classification Search
  CPC ........ G06T 2200/30101; G06K 9/4604; G06N 3/02
  See application file for complete search history.

(56) References Cited

U.S. PATENT DOCUMENTS

| | | |
|---|---|---|
| 7,627,156 B2 | 12/2009 | Margolis et al. |
| 7,940,974 B2 | 5/2011 | Skinner et al. |
| 7,953,266 B2 | 5/2011 | Gulsun et al. |
| 8,526,699 B2 | 9/2013 | Mittal et al. |
| 8,538,105 B2 | 9/2013 | Masumoto |
| 9,129,417 B2 | 9/2015 | Zheng et al. |
| 2010/0004526 A1 | 1/2010 | Wei et al. |
| 2010/0076296 A1 | 3/2010 | Mittal et al. |
| 2012/0274133 A1 | 11/2012 | Takehara et al. |
| 2013/0329038 A1 | 12/2013 | Hager et al. |
| 2017/0032208 A1 | 2/2017 | Hager et al. |

OTHER PUBLICATIONS

Botnar, Rene; et al;"Improved coronary artery definition with T2-weighted, free-breathing, three-dimensional coronary MRA."; Circulation 1999;pp. 3139-3148.

\* cited by examiner

METHOD AND SYSTEM FOR VASCULAR DISEASE DETECTION USING RECURRENT NEURAL NETWORKS

This application is a continuation of U.S. patent application Ser. No. 15/429,806, filed Feb. 10, 2017, which claims the benefit of U.S. Provisional Application No. 62/353,888, filed Jun. 23, 2016, the disclosures of which are herein incorporated by reference.

BACKGROUND OF THE INVENTION

The present invention relates to vascular disease detection and characterization in medical images, and more particularly, to vascular disease detection and characterization in medical images using recurrent neural networks.

Recent generations of computed tomography (CT) scanners enable the acquisition of high quality CT angiography (CTA) images, which can be used as an alternative to invasive angiography for ruling out vascular diseases such as coronary stenosis and plaque. This has led to the development of various algorithms for automated detection of vascular diseases in CTA images. However, due to the varying length of vascular branches, such algorithms typically rely on only local image features extracted along vascular branches, and hence are only able to produce local predictions that independently characterize centerline points along a vascular branch, but do not take into account an overall dependency between image features and predictions along the vascular branch.

BRIEF SUMMARY OF THE INVENTION

The present invention provides a method and system for automated vascular disease detection and characterization in medical images using recurrent neural networks. Embodiments of the present invention exploit sequential image context information embedded along vascular branches to detect and characterize vascular abnormalities in computed tomography angiography (CTA) images of a patient using recurrent neural networks (RNN).

In one embodiment of the present invention, a plurality of 2D cross-section image patches are extracted from a 3D computed tomography angiography (CTA) image, wherein each of 2D cross-section image patches is extracted at a respective one of a plurality of sampling points along a vessel centerline of a vessel of interest in the 3D CTA image. Vascular abnormalities in the vessel of interest are detected by classifying each of the plurality of sampling points along the vessel centerline based on the plurality of 2D cross-section image patches using a trained recurrent neural network (RNN).

These and other advantages of the invention will be apparent to those of ordinary skill in the art by reference to the following detailed description and the accompanying drawings.

DETAILED DESCRIPTION

The present invention relates to a method and system for automated vascular disease detection and characterization in medical images using recurrent neural networks. Embodiments of the present invention are described herein to give a visual understanding of the vascular disease detection method and a method for classifying medical images using recurrent neural networks. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
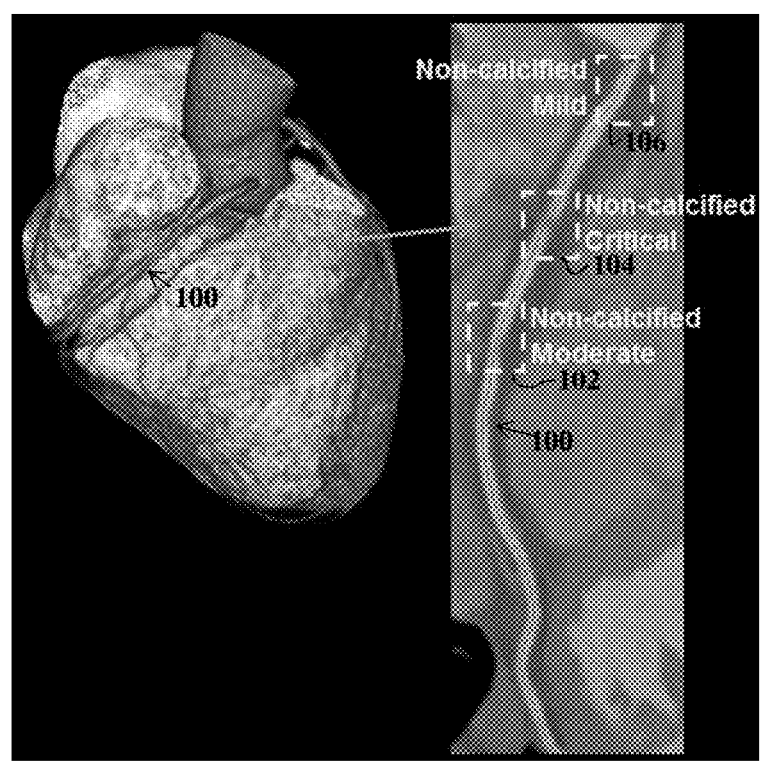
FIG. 1 illustrates an example of vascular disease along a coronary artery.

Embodiments of the present invention detect and characterize vascular abnormalities, such as stenosis, plaques, etc., using sequential image context along a centerline of a vascular branch within a recurrent neural network (RNN) architecture. FIG. 1 illustrates an example of vascular disease along a coronary artery. As shown in FIG. 1, the coronary artery 100 contains vascular abnormalities 102, 104, and 106, each of which is a non-calcified plaque. The non-calcified plaques 102, 104, and 106 are classified as moderate, critical, and mild, respectively. Embodiments of the present invention detect locations of such plaques and stenosis, as well as characterize their type and/or severity.

Figure 2:
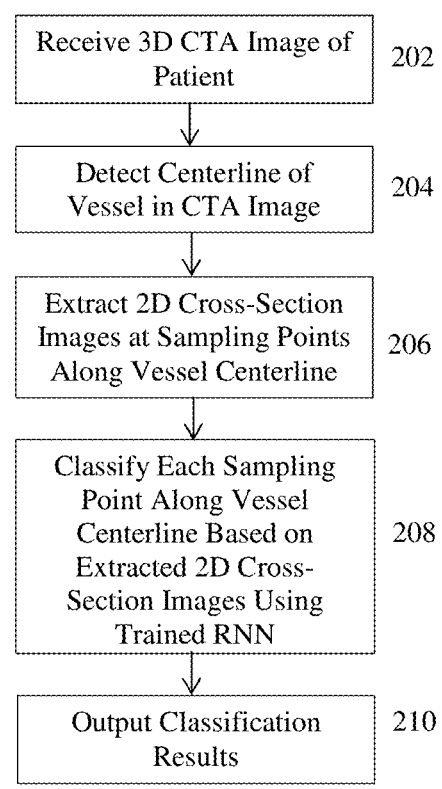
FIG. 2 illustrates a method for vascular disease detection using a recurrent neural network according to an embodiment of the present invention.

FIG. 2 illustrates a method for vascular disease detection using a recurrent neural network according to an embodiment of the present invention. At step 202, a 3D computed tomography angiography (CTA) image of the patient is received. The CTA image includes at least one vessel of interest (e.g., coronary artery, renal artery, cerebral artery, etc.) of the patient. The CTA image can be received directly from a CT scanner or can be received by loading a previously stored CTA image.

At step 204, a centerline of a vessel is detected in the CTA image. In an advantageous implementation, the centerline of the vessel is automatically detected in the CTA image, for example using a centerline tracing method or a machine learning based centerline detection method. The vessel centerline can be detected in the CTA image using a combined model-driven and data-driven method, as described in U.S. Pat. No. 9,129,417, entitled "Method and System for Coronary Artery Centerline Extraction", which is incorporated herein by reference in its entirety. Alternatively, the vessel centerline can be detected in the CTA image using the method described in U.S. Pat. No. 7,953,266, entitled "Robust Vessel Tree Modeling", which is incorporated herein by reference in its entirety. Other automatic or semi-automatic techniques for extracting vessel centerlines may be used as well. In another possible implementation, the vessel centerline may be manually annotated by a user using a user input device, such as a mouse.

At step 206, 2D cross section images are extracted from the 3D CTA image at a plurality of sampling points along the vessel centerline. The vessel centerline is sampled to establish a plurality of sample points along the vessel centerline. A uniformly sampling distribution may be used to define evenly spaced sampling points, but the present invention is not limited thereto and other possible sampling distributions may be used depending on the vessel of interest. A respective 2D cross-section image is extracted from the 3D CTA image at each sampling point on the vessel centerline. Each 2D cross-section image can be a predetermined size image centered at the respective sampling point and aligned with a tangent direction to the vessel centerline at that sampling point.

At step 208, each sampling point along the vessel centerline is classified based on the extracted 2D cross-section images using a trained recurrent neural network (RNN). According to an advantageous embodiment, the classification of each sampling point by the RNN depends not only on the cross-section image extracted at that sampling point, but also on the cross-section images extracted at the other sampling points as well. RNNs have typically been used for prediction tasks from sequential information with multiple time points. According to an advantageous embodiment of the present invention, the cross-section images extracted from various spatial locations (i.e., respective centerline sampling points) in the CTA image are input to an RNN, which processes the spatial sequence of images as if they were a dynamic time-sequence of images. Various types of RNN architectures, such as long short-term memory (LSTM) or gated recurrent unit (GRU), can be used to classify the sampling points of the vessel centerline. In an exemplary implementation described herein, LSTM is used, but the present invention is not limited thereto and any type of RNN architecture may be used.

Figure 3A:
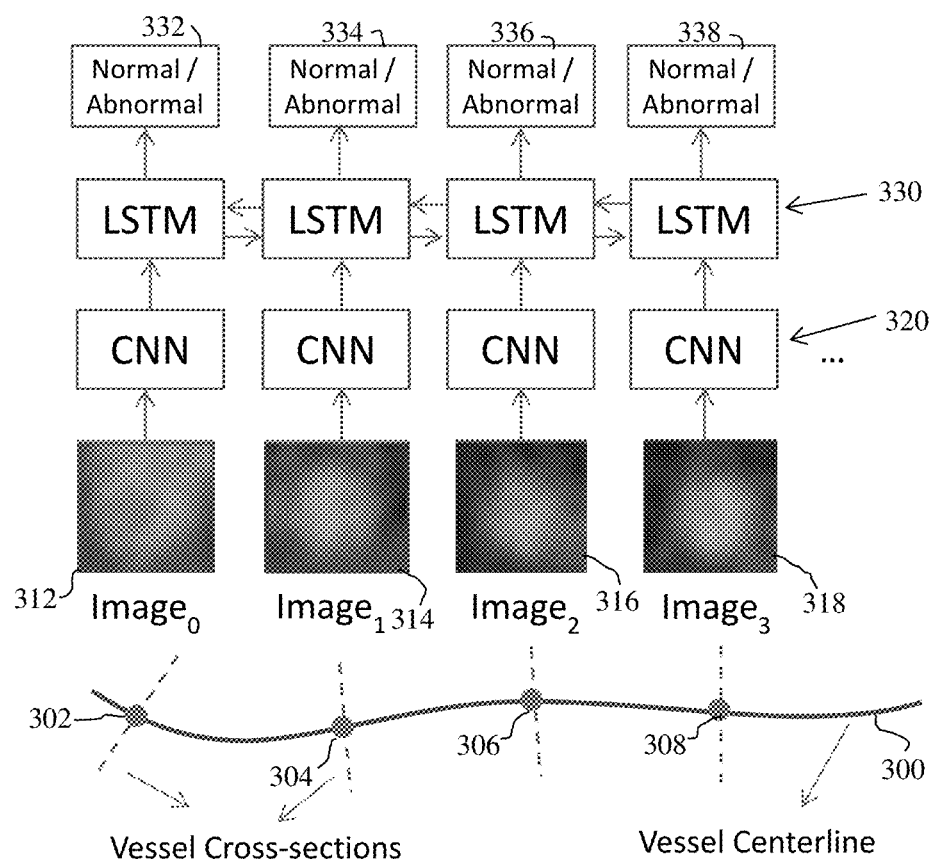
FIG. 3A illustrates a recurrent neural network (RNN) architecture using a bi-directional long short-term memory (LSTM) and a convolutional neural network (CNN) for vessel abnormality detection according to an embodiment of the present invention.

FIG. 3A illustrates an RNN architecture using a bi-directional LSTM and a convolutional neural network (CNN) for vessel abnormality detection according to an embodiment of the present invention. As shown in FIG. 3A, 2D cross-section images 312, 314, 316, and 318 are extracted at sampling points 302, 304, 306, and 308, respectively, along a vessel centerline 300. Each of the 2D cross-section images 312, 314, 316, and 318 can be considered as corresponding to time point of an RNN input. In the embodiment of FIG. 3A, the 2D cross-section images 312, 314, 316, and 318 are connected to an RNN layer 330 through convolutional neural network (CNN) 320. In an alternative implementation, a fully connected layer may be used in place of the CNN 320. The CNN 320 takes image of a fixed size. Accordingly, the 2D cross-section images 312, 314, 316, and 318 input to the CNN 320 can be predetermined size image patches extracted larger 2D cross-section images. The CNN 320 encodes each input image 312, 314, 316, and 318 into a feature vector that is a high-level semantic representation of the input image, and the feature vector extracted for each 2D cross-section image 312, 314, 316, and 318 by the CNN 320 is input to the RNN layer 330. It is to be understood that the same trained CNN 320 (i.e., having the same learned weights) is applied to each of the 2D cross-section images 312, 314, 316, and 318.

Figure 3B:
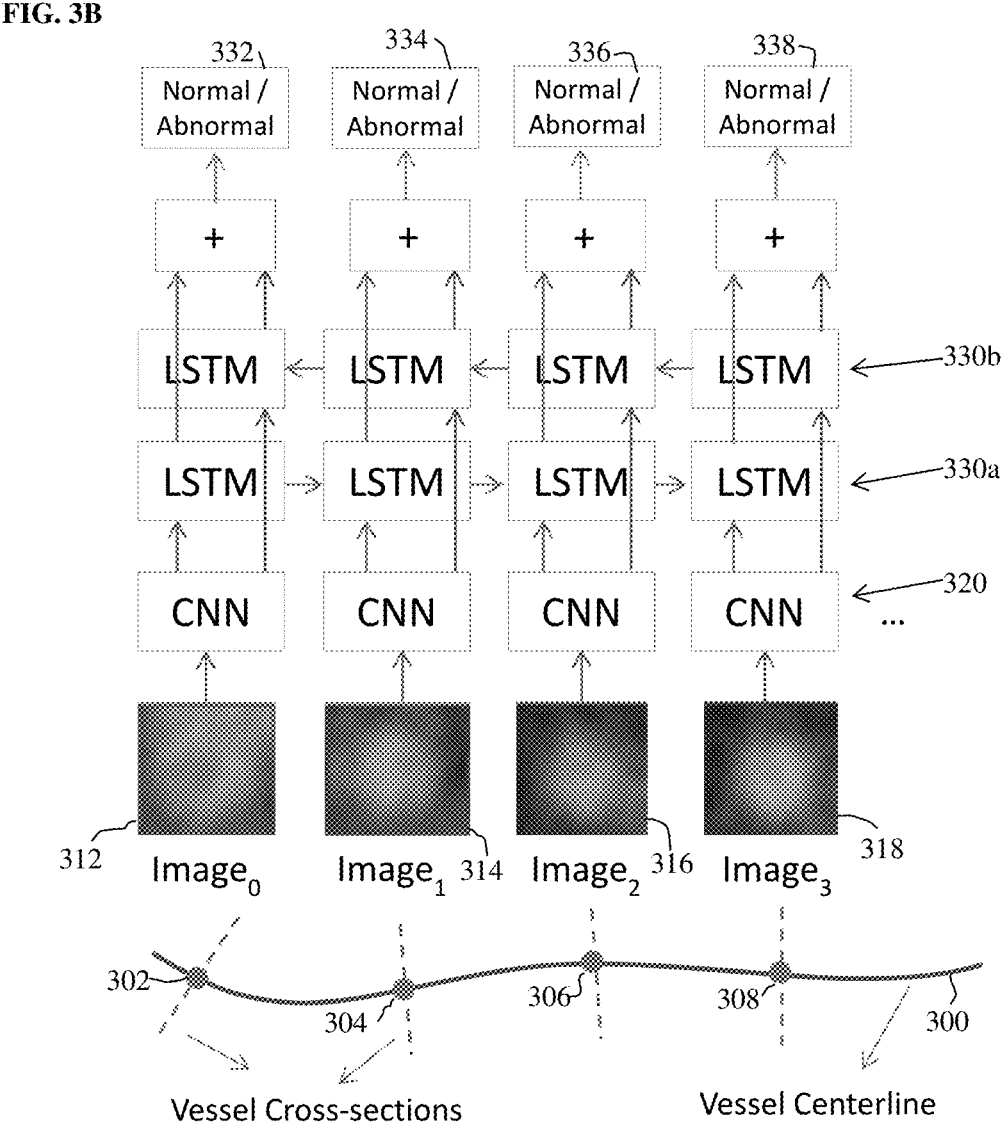
FIG. 3B illustrates the RNN architecture of FIG. 3A with a detailed depiction of the operation of the bi-directional LSTM layer.

The RNN layer 330 inputs the feature vector extracted by the CNN 320 for each of the 2D cross-section images 312, 314, 316, and 318 and outputs a classification result for each of the corresponding sampling points 302, 304, 306, and 308 of the vessel centerline 300. The classification result may be a binary classification of normal or abnormal, as shown in FIG. 3A. The classification result may also be a multi-class label, e.g., for plaque type classification (e.g., calcified, non-calcified, mixed), or a continuous value, e.g., for stenosis grading regression. As shown in FIG. 3A, the RNN layer is implemented as a bi-directional LSTM 330. In typical RNNs, the output of a time point is dependent only on previous time points. However, such a typical RNN architecture is not suitable for detecting and grading stenosis in vessel since a stenosis location and grading is clinically determined based on vessel lumen area/diameter both upstream and downstream of that location. According to an advantageous embodiment of the present invention, a bi-directional RNN is constructed where both the original (forward direction) and reversed (backward direction) inputs are fed into the RNN. FIG. 3B illustrates the RNN architecture of FIG. 3A with a detailed depiction of the operation of the bi-directional LSTM layer 330. As shown in FIG. 3B, the bi-directional LSTM layer 330 includes a forward direction LSTM layer 430a and a backward direction LSTM layer 430b. The forward LSTM layer 430a and the backward LSTM layer 430b are first and second trained LSTMs with different learned weights. The features extracted by the CNN 320 for each 2D cross-section image 312, 314, 316, and 318 are input to both the forward LSTM layer 430a and the backward LSTM layer 430b. The forward LSTM layer starts by classifying a first sampling point (e.g., sampling point 302) in the sequence based on the corresponding 2D cross-section image (e.g., image 312), and then sequentially classifies each subsequent sampling point in a forward direction (e.g., from ostium to distal end) along the vessel centerline based on the corresponding 2D cross-section image and image information from the cross-section images corresponding to the previously classified sampling points. The backward LSTM layer starts by classifying a final sampling point (e.g., sampling point 308) in the sequence based on the corresponding 2D cross-section image (e.g., image 318), and then sequentially classifies each preceding sampling point in a backward direction (e.g., from distal end to ostium) along the centerline based on the corresponding 2D cross-section image and image information from the cross-section images corresponding to the previously classified sampling points. That is, the forward LSTM layer starts at one end of the vessel centerline 300 and works forward and the backward LSTM layer starts at the other end of the vessel centerline 300 and works backward. The forward LSTM and the backward LSTM. The forward LSTM output and the backward LSTM output for each sampling point are combined (e.g., by concatenating, summing, or averaging (weighted or unweighted) the forward and backward outputs) in order to determine the final classification results 332, 334, 336, and 338. For example, if the forward and backward LSTMs directly output the classification labels, the results of two LSTMs can be summed or averaged. In another possible implementation, 1-2 neural network layers can be added between the LSTM output and the final classification label. In this case, the outputs of two LSTMs can be concatenated into a longer feature vector as input to the additional neural network layers.

Additional details regarding training the RNN/LSTM architecture are described in greater detail below. Furthermore, in an advantageous embodiment of the present invention, the RNN/LSTM architecture shown in FIGS. 3A and 3B may be modified to incorporate multi-scale image information, as described below in connection with the method of FIG. 6.

Returning to FIG. 2, at step 210, the classification results for each sampling point along the vessel centerline are output. For example, each sampling point can be classified as normal or abnormal. The RNN architecture may output a multi-class label for each sampling point for plaque type classification. For example, each sampling point may be classified as one of normal, calcified plaque, non-calcified plaque, or mixed plaque. The RNN architecture may output a numerical value for each sampling point. This numerical value can be used to determine the abnormal or normal classification as well as a severity (e.g., mild, moderate, critical) for each sampling point. The classification results may be visualized in various ways. For example, locations along the vessel centerline classified as abnormal can be provided to the user or highlighted in a CTA image displayed on a display device, along with characterizations of the type of plaque and/or the severity of the abnormality. In another possible implementation, the numerical values determined for the sampling points can be converted to a color map which can be displayed to provide a visualization of vascular disease along the entire vessel.

The temporal resolution of most medical imaging modalities has been advance to a stage that real-time video sequences can be captured in routine clinical practice (e.g., ultrasound sequences of a beating heart). According to an embodiment of the present invention, input from a static CTA image is formulated as a dynamic sequence. In particular, at each vessel centerline point, and image patch is sampled perpendicular to the centerline trajectory. Moving along the centerline from ostium to distal end, a dynamic sequence of cross-section images is generated. The length of the sequence may vary from one case to another. Most machine learning algorithms only accept an input vector with a fixed length. Furthermore, the input image size for most machine learning algorithms is set as a hyperparameter, which is fixed after training. However, the object being detected may have significantly different size across patients or even within the same sequence. The present inventors have recognized that a method that can handle variations in object size as well as input sequence length is desirable.

A window (with a fixed length) based approach is often used to handle an input with variable length. For example, it is possible to consider only a current frame together with n frames before and after the current frame, resulting in an observation window of 2 n+1. With an input of a fixed length, many existing machine learning algorithms (e.g., AdaBoost or Support Vector Machine) can be applied. However, the length of the event (e.g., coronary artery stenosis) being detected may vary significantly, and a fixed window may be too small for some datasets, but too large for others. Embodiments of the present invention use LSTM to handle input with variable length for vascular disease (e.g., coronary plaque) detection, as illustrated in FIGS. 3A and 3B. As a kind of RNN, LSTM considers all input until the current frame to make a prediction. Furthermore, as illustrated in FIGS. 3A and 3B, embodiments of the present invention use bi-directional LSTM, which utilizes two LSTM layers, one handling forward observation of a sequence and one handling backward observation of the sequence. Accordingly, by using bi-direction LSTM, the whole input is observed to predict if a current position (sampling point) contains or coronary plaque or not.

As described above, a CNN is used to encode each input image into a feature vector, which is a high level semantic representation of the input image. The CNN takes an image with a fixed size. However, the object being detected/classified may have significantly different sizes across patients or even with the same sequence. The optimal field-of-view (FoV) to perform classification for each sequence or each frame may be different.

Figure 4:
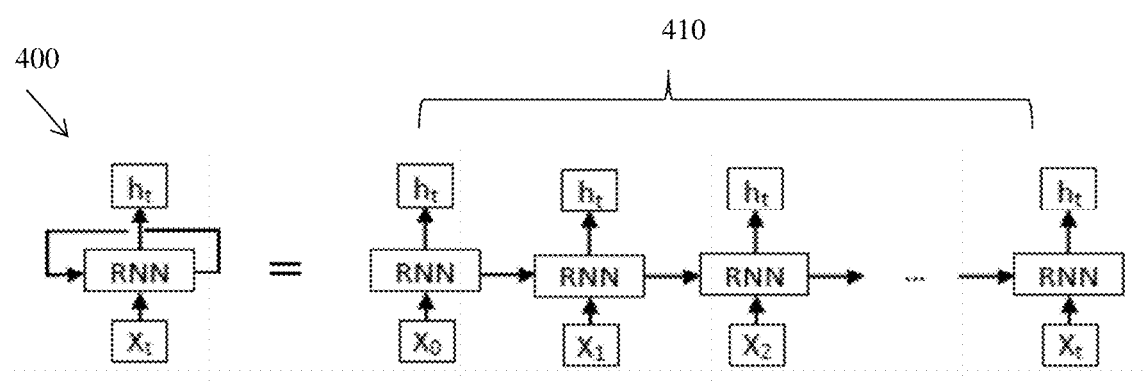
FIG. 4 illustrates an RNN and an unrolled representation of the RNN.

A recurrent neural network (RNN) is an architecture that can handle input with variable length. FIG. 4 illustrates an RNN 400 and an unrolled representation 410 of the RNN 400. Different from a conventional network, an RNN contains a feedback loop in its memory cell, as shown in RNN 400 of FIG. 4. As shown by the unrolled representation 410 of the RNN 400 in FIG. 4, given an input sequence $[X_0, X_1, \ldots X_t]$, an RNN can be "unrolled" t times to generate a loopless architecture matching the input length. An unrolled network has t+1 layers and each layer is identical (i.e., each layer shares the same learned weights). After unrolling, an RNN can be trained based on ground truth training samples with back-propagation, similar to a conventional feed-forward neural network. The only difference in the training is that the weights of each copy of the network need to be averaged to ensure that all copies are identical after the update. One challenge for training is that, during the gradient back-propagation phase, the gradient signal can end up being multiplied a large number of times (as many as the number of time steps). This leads to either gradient vanishing (when the magnitude of the gradient signal is smaller than 1) or gradient explosion (when the gradient magnitude is greater than 1). Under gradient vanishing, the network will not be effectively updated; while under gradient explosion, the training process diverges. Therefore, conventional RNN has an issue to train with a long sequence, and thus has a limitation in learning long term memory.

Figure 5:
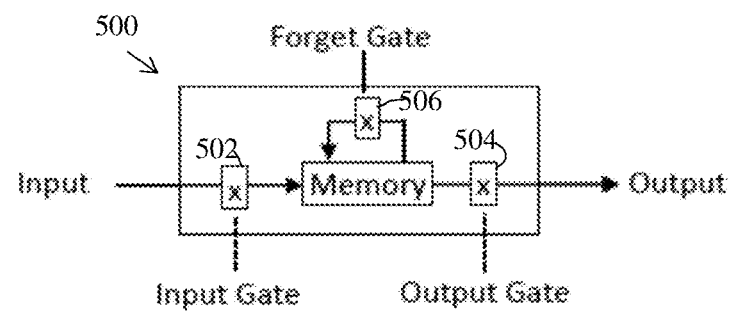
FIG. 5 illustrates an LSTM network.

Long Short-Term Memory (LSTM) addresses the long term memory issue of conventional RNN by introducing three gates, which control the input, output, and memory state. FIG. 5 illustrates an LSTM network. As shown in FIG. 5, the LSTM network 500 includes an input gate 502, an output gate 504, and a forget gate 506, which control the input, output, and memory state, respectively. Suppose at time step t−1, the memory state is $C_{t-1}$, the output state is $h_{t-1}$, and the input state at time t is $X_t$. The opening or closing of a gate is controlled by a sigmoid function of the current input signal $X_t$ and output signal of the last time point $h_{t-1}$ as follows:

$$i_t = \sigma(W_i x_t + U_i h_{t-1} + b_i),$$

$$f_t = \sigma(W_f x_t + U_f h_{t-1} + b_f),$$

$$o_t = \sigma(W_o x_t + U_o h_{t-1} + b_o),$$

where $i_t$, $f_t$, and $o_t$ are gate functions of the input gate, forget gate, and output gate, respectively, W, U are weights and b is bias, which are learned from a training set. Given the current observation (e.g., the current 2D cross section image in the method of FIG. 2), the memory state $C_t$ will be updated as:

$$C_t = i_t * \tan h(W_c x_t + U_c h_{t-1} + b_c) + f_t C_{t-1},$$

and the new output $h_t$ is:

$$h_t = o_t * \tan h(C_t).$$

With coordinated operation of the gates, LSTM can keep the memory state a long period of time (set $f_t=1$) by ignoring noisy input (set $i_t=0$) to achieve long term memory. Or, it can discard the memory state quickly (e.g., set $f_t=0$ and set $i_t=1$) to learn short term memory. It is to be understood that in the embodiment of FIGS. 2, 3A, and 3B, each sampling point is considered to be a "time step" (and each 2D cross-section image patch the corresponding input) even though the sampling points are a spatial sequence, not a time sequence.

Figure 6:
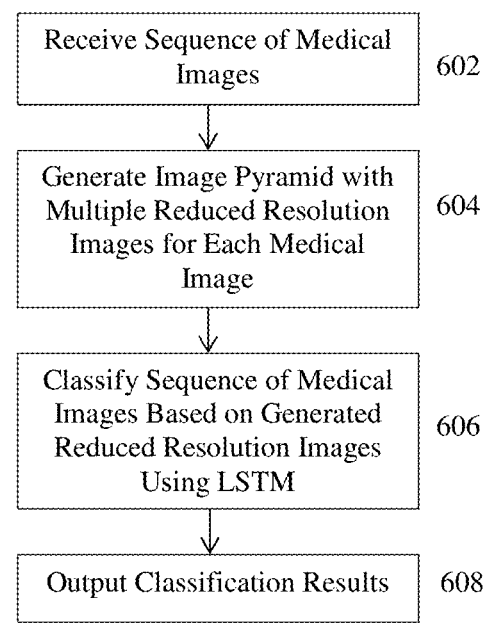
FIG. 6 illustrates a method for classifying a sequence of medical images using a multiscale spatio-temporal LSTM according to an embodiment of the present invention.

LSTM has typically been used for applications involving 1D data sequences. In order to use an image an input, a compact high-level representation of the image is extracted, e.g., using a CNN (as shown in FIGS. 3A and 3B). The CNN takes an image with fixed size as input (otherwise padding or cropping is performed to normalize the size). However, the object of interest may have quite different sizes in different sequences. The size of the object may even vary within the same sequence. A fixed field-of-view (FoV) may not be optimal to handle such a large variation. According to an advantageous embodiment of the present invention, multiscale image information can be incorporated in the LSTM framework. FIG. 6 illustrates a method for classifying a sequence of medical images using a multiscale spatio-temporal LSTM according to an embodiment of the present invention. Although the method of FIG. 6 is described using LSTM architecture, the method is not limited to LSTM and may be applied to RNN in general. In an advantageous embodiment, the method of FIG. 6 can be used in step 208 of FIG. 2 with the architecture of FIGS. 3A and 3B to perform detection and characterization of vascular disease. However, the present invention is not limited thereto, and the method of FIG. 6 may be applied to 2D or 3D medical images to perform other medical image classification tasks as well.

At step 602, a sequence of medical images is received. When used to perform vascular disease detection and characterization, the sequence of medical images is the 2D cross-section images (or image patches) extracted at the sampling points of the vessel centerline. The sequence can be a sequence of images extracted at various spatial locations from a static image (as in the vascular disease detection embodiment), or a time sequence of 2D or 3D medical images. The medical images can be received directly from a medical image acquisition device or may be received by loading a previously stored sequence of medical images.

At step 604, an image pyramid with multiple reduced resolution images is generated for each image in the sequence of medical images. An image pyramid is a scale space representation of the input image data. In the vascular disease detection embodiment, an image pyramid with multiple reduced resolution images is generated for each 2D cross-section image. For example, a three-level image pyramid may have reduced resolution images of 8 mm, 4 mm, and 2 mm from coarse to fine. An image patch with a fixed size in pixels (or voxels) actually has a different field-of-view (FoV) at different resolutions. For example, a patch with 15×15 pixels has a FoV of 120×120 mm$^2$ at 8 mm resolution, but an FoV of 30×30 mm$^2$ at 2 mm resolution.

At step 606, the sequence of medical images is classified based on the multiple reduced resolution images generated for each image in the sequence of medical images using a trained LSTM architecture. The LSTM architecture outputs a classification result for each "time step" (e.g., each sampling point in the vascular disease detection embodiment).

In the vascular disease detection embodiment, the LSTM architecture utilizes a bi-directional LSTM.

Figure 7:
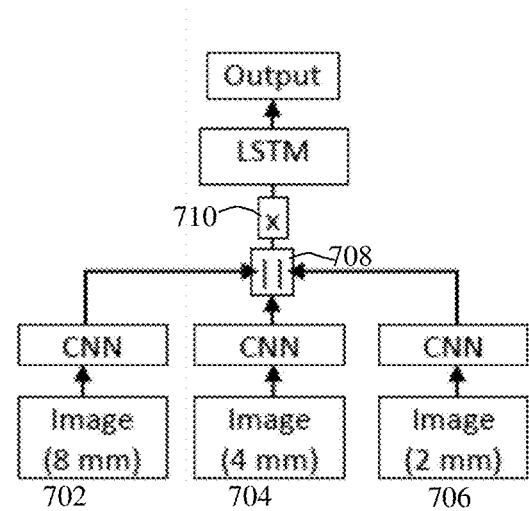
FIG. 7 illustrates a concatenated multiscale spatio-temporal LSTM according to an embodiment of the present invention.
Figure 8:
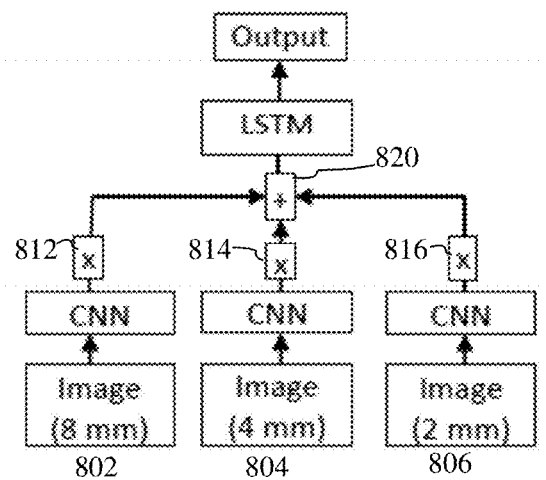
FIG. 8 illustrates a gated multiscale spatio-temporal LSTM according to an embodiment of the present invention.
Figure 9:
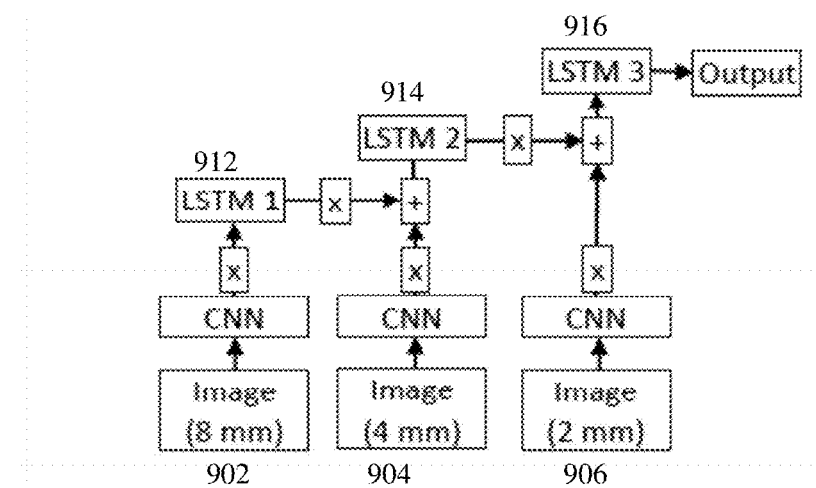
FIG. 9 illustrates an integrated concatenated and gated multiscale spatio-temporal LSTM according to an embodiment of the present invention.

The image pyramid for each "time step" (or spatial location) can be used in various different ways in the LSTM framework. FIGS. 7, 8, and 9 illustrate alternative embodiments for incorporating the multi-resolution image information into the LSTM framework. FIG. 7 illustrates a concatenated multiscale spatio-temporal LSTM according to an embodiment of the present invention. As illustrated in FIG. 7, in one embodiment, a concatenation operation 708 is used to concatenate CNN features extracted from image patches 702, 704, and 706 with different image resolutions (e.g., 8 mm, 4 mm, and 2 mm, respectively) into one long feature vector. The concatenated feature vector then is input to the LSTM via the input gate 710 of the LSTM. An advantage of this embodiment is that there is no change to the LSTM architecture, but it is trained using concatenated features extracted from multi-resolution input images. A disadvantage with this embodiment is that the most discriminative features may be overwhelmed by less discriminative features, which can limit the overall improvement on recognition accuracy achieved.

FIG. 8 illustrates a gated multiscale spatio-temporal LSTM according to an embodiment of the present invention. As illustrated in FIG. 8, in another embodiment, the "gating" of the LSTM can be extended to the image pyramid images. Instead of using a single gate for the input a separate gate can be used (and a separate gating function learned) for each pyramid level. As shown in FIG. 8, gates 812, 814, and 816 control the input of the CNN features for the image patches 802, 814, and 816, respectively with different image resolutions (e.g., 8 mm, 4 mm, and 2 mm, respectively). After gating, a summation operation 820 is used to add the input signals from the different resolutions together, which does not change the input dimension (different from the concatenation operation of FIG. 7). This embodiment allows the LSTM to be trained to select the right "scale" by ignoring information from other resolutions.

FIG. 9 illustrates an integrated concatenated and gated multiscale spatio-temporal LSTM according to an embodiment of the present invention. For both concatenated (FIG. 7) and gated (FIG. 8) spatio-temporal LSTMs, the integration of multiscale image information is limited to the input and a single LSTM is used to perform learning. However, it may be beneficial for some applications to leverage information from multiple scales more cooperatively to improve recognition accuracy. In the embodiment of FIG. 9, the multiscale image information is integrated more tightly. As shown in FIG. 9, a respective LSTM (LSTM 1 912, LSTM 2 914, and LSTM 3 916) is trained for each pyramid level image 902, 904, and 906, and the output of a lower level LSTM is fed to the next level LSTM. The higher level LSTM takes two inputs: one from the image at it corresponding pyramid level and the other from the lower level LSTM. These two input signals can be integrated by either concatenation or gating. Alternatively, the lower level LSTM output can be used to control the gates of the higher level LSTM. In this case, the higher level LSTM takes one input from its own pyramid level image, but the gates are controlled by three signals: current input, its own previous output, and current output of the lower level LSTM.

Returning to FIG. 6, at step 608, the classification results are output. In particular the classification results for each "time step" (or each spatial location) (e.g., each sampling point on the vessel centerline) can be output, for example, by displaying the classification results on a display device of a computer system.

By integrating multiscale image information using the method of FIG. 6 into the vascular disease detection and characterization method of FIG. 2, the detection accuracy of vascular disease can be improved in the presence of varying vessel (e.g., coronary artery) size. The method of FIG. 6 can also be used for other medical imaging classification/detection applications, as well.

In the embodiments described above, the methods of FIG. 2 and FIG. 6 are utilized to detect and characterize vascular disease (abnormalities) from a CTA image of a patient. These methods may be similarly applied for other vascular classification applications, as well. For example, the above described methods may be similarly applied to perform vessel lumen and outer wall cross-sectional diameter or area estimation. Most quantitative vascular analysis methods use a 3D model of the vessel to calculate diameter/area. Estimating vessel diameter directly from the image data can remove the need to compute a 3D model of the vessel, which is a very time consuming task. The above described methods may also be similarly applied to detecting image artifacts, such as motion artifacts, blooming artifacts due to calcification and/or metal implants, and partial volume effects. Automated detection of vessel image artifacts in medical images as soon as they are acquired can greatly benefit the clinical workflow by flagging such images for re-acquisition while the patient is still on the table. The detection of artifacts may also be used to provide feedback to the image reconstruction algorithm to determine an optimal set of reconstruction parameters. The above described methods may also be similarly applied to detection of vessel centerline leakage. Methods have been proposed to extract vessel centerlines in medical images with very high sensitivity, but at the expense of false branches leaking into nearby structures or other vessels. There is a need to distinguish true centerlines from leakage. The above described methods can be used to train a centerline leakage detector. The above described methods may also be similarly applied to detection of vascular devices, such as stents, grafts, coils, and clips in the vasculature.

Figure 10:
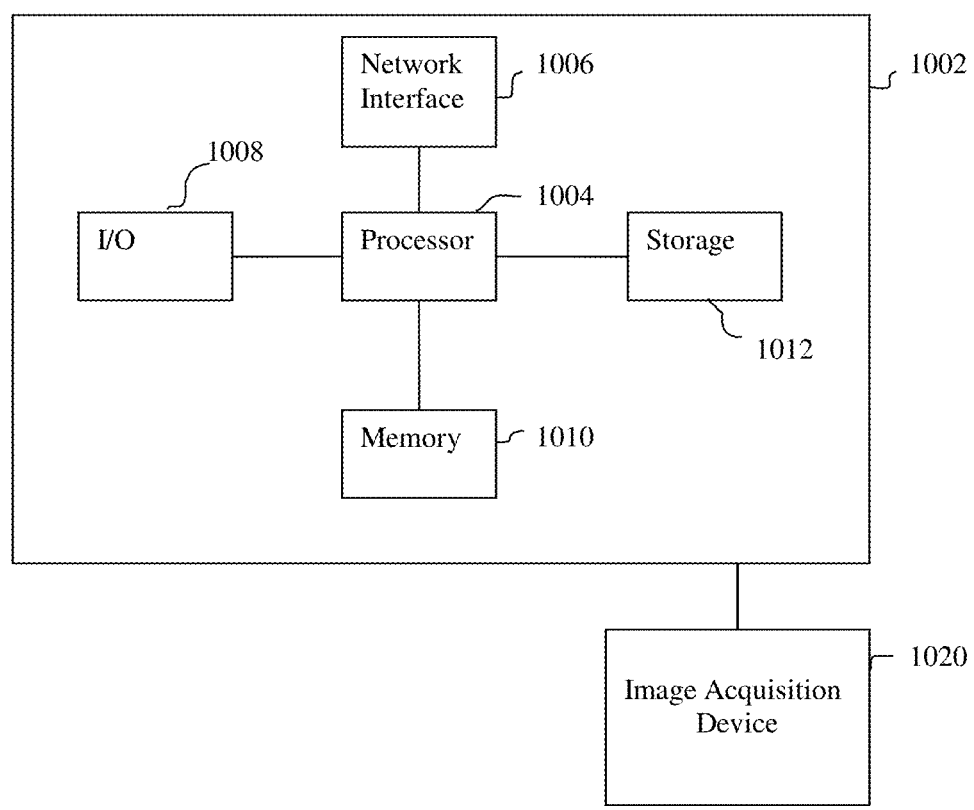
FIG. 10 is a high-level block diagram of a computer capable of implementing the present invention.

The above-described methods for vascular disease detection using a recurrent neural network and classifying a sequence of medical images using a multiscale spatio-temporal LSTM may be implemented on a computer using well-known computer processors, memory units, storage devices, computer software, and other components. A high-level block diagram of such a computer is illustrated in FIG. 10. Computer 1002 contains a processor 1004, which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, the steps of the methods of FIGS. 2 and 6 may be defined by the computer program instructions stored in the memory 1010 and/or storage 1012 and controlled by the processor 1004 executing the computer program instructions. An image acquisition device 1020, such as a CT scanner, can be connected to the computer 1002 to input image data to the computer 1002. It is possible to implement the image acquisition device 1020 and the computer 1002 as one device. It is also possible that the image acquisition device 1020 and the computer 1002 communicate wirelessly through a network. In a possible embodiment, the computer 1002 can be located remotely with respect to the image acquisition device 1020 and the method steps described herein can be performed as part of a server or cloud based service. In this case, the method steps may be performed on a single computer or distributed between multiple networked computers. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). Such input/output devices 1008 may be used in conjunction with a set of computer programs as an annotation tool to annotate volumes received from the image acquisition device 1020. One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for vessel centerline leakage detection using a recurrent neural network, comprising:
   extracting a plurality of 2D cross-section image patches from a 3D computed tomography angiography (CTA) image, wherein each of 2D cross-section image patches is extracted at a respective one of a plurality of sampling points along a vessel centerline of a vessel of interest in the 3D CTA image; and
   detecting false branches of the vessel centerline of the vessel of interest by classifying each of the plurality of sampling points along the vessel centerline based on the plurality of 2D cross-section image patches using a trained recurrent neural network (RNN).

2. The method of claim 1, further comprising:
   detecting the vessel centerline of the vessel of interest in the 3D CTA image.

3. The method of claim 1, wherein detecting false branches of the vessel centerline of the vessel of interest by classifying each of the plurality of sampling points along the vessel centerline based on the plurality of 2D cross-section image patches using a trained recurrent neural network (RNN) comprises:
   encoding each of the 2D cross-section image patches into a respective feature vector using a trained convolutional neural network (CNN); and
   classifying each of the plurality of sampling points along the vessel centerline based on the feature vectors corresponding to the plurality of 2D cross-section image patches using a trained bi-directional RNN.

4. The method of claim 3, wherein the bi-directional RNN is a bi-directional long short-term memory (LSTM) network, and classifying each of the plurality of sampling points along the vessel centerline based on the feature vectors corresponding to the plurality of 2D cross-section image patches using a trained bi-directional RNN comprises:

inputting the feature vectors corresponding to the plurality of 2D cross-section image patches to a forward LSTM network and a backward LSTM network;

sequentially classifying each of the plurality of sampling points along the vessel centerline in a forward direction from a first sampling point to an $n^{th}$ sampling point using the forward LSTM network, wherein the forward LSTM network classifies each sampling point based on the feature vector corresponding to the 2D cross-section image extracted at that sampling point and the feature vectors corresponding to the 2D cross-section images extracted at sampling points previously classified by the forward LSTM network;

sequentially classifying each of the plurality of sampling points along the vessel centerline in a backward direction from the nth sampling point to the first sampling point using the backward LSTM network, wherein the backward LSTM network classifies each sampling point based on the feature vector corresponding to the 2D cross-section image extracted at that sampling point and the feature vectors corresponding to the 2D cross-section images extracted at sampling points previously classified by the backward LSTM network; and combining classification results output by the forward LSTM and classification results output by the backward LSTM for each of the plurality of sampling points.

5. The method of claim 1, wherein detecting false branches of the vessel centerline of the vessel of interest by classifying each of the plurality of sampling points along the vessel centerline based on the plurality of 2D cross-section image patches using a trained recurrent neural network (RNN) comprises:

generating multiscale image information for each of the 2D cross-section image patches; and classifying each of the plurality of sampling points along the vessel centerline based on the multiscale image information generated for the plurality of 2D cross-section image patches using the trained RNN.

6. The method of claim 5, wherein generating multiscale image information for each of the 2D cross-section image patches comprises:

generating an image pyramid with multiple reduced resolution image patches for each of the 2D cross-section image patches.

7. The method of claim 6, wherein the trained RNN is a bi-directional long short-term memory (LSTM) network, and classifying each of the plurality of sampling points along the vessel centerline based on the multiscale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

concatenating the feature vectors encoded from all of the multiple reduced resolution images into a concatenated feature vector;

inputting the concatenated feature vector the current sampling point based on a learned input gating function of the bi-directional LSTM; and classifying the current sampling point based on the input concatenated feature vector for the current sampling point and a memory state of the bi-directional LSTM at the current sampling point.

8. The method of claim 6, wherein the trained RNN is a bi-directional long short-term memory (LSTM) network, and classifying each of the plurality of sampling points along the vessel centerline based on the multiscale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

inputting the feature vector encoded for each resolution based on a respective learned gating function of the bi-directional LSTM for each resolution;

summing the feature vectors input by the respective learned gating functions for each resolution; and classifying the current sampling point based on the summed input feature vectors for the current sampling point and a memory state of the bi-directional LSTM at the current sampling point.

9. The method of claim 6, wherein classifying each of the plurality of sampling points along the vessel centerline based on the multiscale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

inputting the encoded feature vector for each resolution to a respective trained long short-term memory (LSTM) network for each resolution; and sequentially performing classification of the current sample point by the respective trained LSTM for each resolution, starting with a lowest resolution level LSTM, wherein an output of each LSTM other than a highest resolution level LSTM is input to a subsequent LSTM at a next resolution level and the highest resolution level LSTM outputs a classification result for the current sampling point.

10. The method of claim 1, wherein detecting false branches of the vessel centerline of the vessel of interest by classifying each of the plurality of sampling points along the vessel centerline based on the plurality of 2D cross-section image patches using a trained recurrent neural network (RNN) comprises:

classifying each of the plurality of sampling points along the vessel centerline as a true vessel centerline point or a false vessel centerline point based on the plurality of 2D cross-section image patches using the trained recurrent neural network (RNN).

11. An apparatus for vessel centerline leakage detection using a recurrent neural network, comprising:

means for extracting a plurality of 2D cross-section image patches from a 3D computed tomography angiography (CTA) image, wherein each of 2D cross-section image patches is extracted at a respective one of a plurality of sampling points along a vessel centerline of a vessel of interest in the 3D CTA image; and means for detecting false branches of the vessel centerline of the vessel of interest by classifying each of the plurality of sampling points along the vessel centerline based on the plurality of 2D cross-section image patches using a trained recurrent neural network (RNN).

12. The apparatus of claim 11, wherein the means for detecting false branches of the vessel centerline of the vessel of interest by classifying each of the plurality of sampling points along the vessel centerline based on the plurality of 2D cross-section image patches using a trained recurrent neural network (RNN) comprises:
   means for encoding each of the 2D cross-section image patches into a respective feature vector using a trained convolutional neural network (CNN); and
   means for classifying each of the plurality of sampling points along the vessel centerline based on the feature vectors corresponding to the plurality of 2D cross-section image patches using a trained bi-directional RNN.

13. The apparatus of claim 12, wherein the bi-directional RNN is a bi-directional long short-term memory (LSTM) network, and the means for classifying each of the plurality of sampling points along the vessel centerline based on the feature vectors corresponding to the plurality of 2D cross-section image patches using a trained bi-directional RNN comprises:
   means for inputting the feature vectors corresponding to the plurality of 2D cross-section image patches to a forward LSTM network and a backward LSTM network;
   means for sequentially classifying each of the plurality of sampling points along the vessel centerline in a forward direction from a first sampling point to an nth sampling point using the forward LSTM network, wherein the forward LSTM network classifies each sampling point based on the feature vector corresponding to the 2D cross-section image extracted at that sampling point and the feature vectors corresponding to the 2D cross-section images extracted at sampling points previously classified by the forward LSTM network;
   means for sequentially classifying each of the plurality of sampling points along the vessel centerline in a backward direction from the nth sampling point to the first sampling point using the backward LSTM network, wherein the backward LSTM network classifies each sampling point based on the feature vector corresponding to the 2D cross-section image extracted at that sampling point and the feature vectors corresponding to the 2D cross-section images extracted at sampling points previously classified by the backward LSTM network; and
   means for combining classification results output by the forward LSTM and classification results output by the backward LSTM for each of the plurality of sampling points.

14. The apparatus of claim 11, wherein the means for detecting false branches of the vessel centerline of the vessel of interest by classifying each of the plurality of sampling points along the vessel centerline based on the plurality of 2D cross-section image patches using a trained recurrent neural network (RNN) comprises:
   means for generating multiscale image information for each of the 2D cross-section image patches; and
   means for classifying each of the plurality of sampling points along the vessel centerline based on the multiscale image information generated for the plurality of 2D cross-section image patches using the trained RNN.

15. The apparatus of claim 14, wherein the means for generating multiscale image information for each of the 2D cross-section image patches comprises:
   means for generating an image pyramid with multiple reduced resolution image patches for each of the 2D cross-section image patches.

16. The apparatus of claim 15, wherein the trained RNN is a bi-directional long short-term memory (LSTM) network, and the means for classifying each of the plurality of sampling points along the vessel centerline based on the multiscale image information generated for the plurality of 2D cross-section image patches using the trained RNN comprises, for each of the plurality of sampling points along the vessel centerline:
   means for encoding each of multiple reduced resolution image patches generated for the 2D cross-section image patch extracted at a current sampling point into a respective feature vector for each resolution using a respective trained convolutional neural network (CNN) for each resolution;
   means for concatenating the feature vectors encoded from all of the multiple reduced resolution images into a concatenated feature vector;
   means for inputting the concatenated feature vector the current sampling point based on a learned input gating function of the bi-directional LSTM; and
   means for classifying the current sampling point based on the input concatenated feature vector for the current sampling point and a memory state of the bi-directional LSTM at the current sampling point.

17. The apparatus of claim 15, wherein the trained RNN is a bi-directional long short-term memory (LSTM) network, and the means for classifying each of the plurality of sampling points along the vessel centerline based on the multiscale image information generated for the plurality of 2D cross-section image patches using the trained RNN comprises, for each of the plurality of sampling points along the vessel centerline:
   means for encoding each of multiple reduced resolution image patches generated for the 2D cross-section image patch extracted at a current sampling point into a respective feature vector for each resolution using a respective trained convolutional neural network (CNN) for each resolution;
   means for inputting the feature vector encoded for each resolution based on a respective learned gating function of the bi-directional LSTM for each resolution;
   means for summing the feature vectors input by the respective learned gating functions for each resolution; and
   means for classifying the current sampling point based on the summed input feature vectors for the current sampling point and a memory state of the bi-directional LSTM at the current sampling point.

18. The apparatus of claim 15, wherein the means for classifying each of the plurality of sampling points along the vessel centerline based on the multiscale image information generated for the plurality of 2D cross-section image patches using the trained RNN comprises, for each of the plurality of sampling points along the vessel centerline:
   means for encoding each of multiple reduced resolution image patches generated for the 2D cross-section image patch extracted at a current sampling point into a respective feature vector for each resolution using a respective trained convolutional neural network (CNN) for each resolution;

means for inputting the encoded feature vector for each resolution to a respective trained long short-term memory (LSTM) network for each resolution; and means for sequentially performing classification of the current sample point by the respective trained LSTM for each resolution, starting with a lowest resolution level LSTM, wherein an output of each LSTM other than a highest resolution level LSTM is input to a subsequent LSTM at a next resolution level and the highest resolution level LSTM outputs a classification result for the current sampling point.

19. A non-transitory computer readable medium storing computer program instructions for vessel centerline leakage detection using a recurrent neural network, the computer program instructions when executed by a processor cause the processor to perform operations comprising:

extracting a plurality of 2D cross-section image patches from a 3D computed tomography angiography (CTA) image, wherein each of 2D cross-section image patches is extracted at a respective one of a plurality of sampling points along a vessel centerline of a vessel of interest in the 3D CTA image; and detecting false branches of the vessel centerline of the vessel of interest by classifying each of the plurality of sampling points along the vessel centerline based on the plurality of 2D cross-section image patches using a trained recurrent neural network (RNN).

20. The non-transitory computer readable medium of claim 19, wherein detecting false branches of the vessel centerline of the vessel of interest by classifying each of the plurality of sampling points along the vessel centerline based on the plurality of 2D cross-section image patches using a trained recurrent neural network (RNN) comprises:

encoding each of the 2D cross-section image patches into a respective feature vector using a trained convolutional neural network (CNN); and classifying each of the plurality of sampling points along the vessel centerline based on the feature vectors corresponding to the plurality of 2D cross-section image patches using a trained bi-directional RNN.

21. The non-transitory computer readable medium of claim 20, wherein the bi-directional RNN is a bi-directional long short-term memory (LSTM) network, and classifying each of the plurality of sampling points along the vessel centerline based on the feature vectors corresponding to the plurality of 2D cross-section image patches using a trained bi-directional RNN comprises:

inputting the feature vectors corresponding to the plurality of 2D cross-section image patches to a forward LSTM network and a backward LSTM network;

sequentially classifying each of the plurality of sampling points along the vessel centerline in a forward direction from a first sampling point to an nth sampling point using the forward LSTM network, wherein the forward LSTM network classifies each sampling point based on the feature vector corresponding to the 2D cross-section image extracted at that sampling point and the feature vectors corresponding to the 2D cross-section images extracted at sampling points previously classified by the forward LSTM network;

sequentially classifying each of the plurality of sampling points along the vessel centerline in a backward direction from the nth sampling point to the first sampling point using the backward LSTM network, wherein the backward LSTM network classifies each sampling point based on the feature vector corresponding to the 2D cross-section image extracted at that sampling point and the feature vectors corresponding to the 2D cross-section images extracted at sampling points previously classified by the backward LSTM network; and combining classification results output by the forward LSTM and classification results output by the backward LSTM for each of the plurality of sampling points.

22. The non-transitory computer readable medium of claim 19, wherein detecting false branches of the vessel centerline of the vessel of interest by classifying each of the plurality of sampling points along the vessel centerline based on the plurality of 2D cross-section image patches using a trained recurrent neural network (RNN) comprises:

generating multiscale image information for each of the 2D cross-section image patches; and classifying each of the plurality of sampling points along the vessel centerline based on the multiscale image information generated for the plurality of 2D cross-section image patches using the trained RNN.

23. The non-transitory computer readable medium of claim 22, wherein generating multiscale image information for each of the 2D cross-section image patches comprises:

generating an image pyramid with multiple reduced resolution image patches for each of the 2D cross-section image patches.

24. The non-transitory computer readable medium of claim 23, wherein the trained RNN is a bi-directional long short-term memory (LSTM) network, and classifying each of the plurality of sampling points along the vessel centerline based on the multiscale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

concatenating the feature vectors encoded from all of the multiple reduced resolution images into a concatenated feature vector;

inputting the concatenated feature vector the current sampling point based on a learned input gating function of the bi-directional LSTM; and classifying the current sampling point based on the input concatenated feature vector for the current sampling point and a memory state of the bi-directional LSTM at the current sampling point.

25. The non-transitory computer readable medium of claim 23, wherein the trained RNN is a bi-directional long short-term memory (LSTM) network, and classifying each of the plurality of sampling points along the vessel centerline based on the multiscale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

inputting the feature vector encoded for each resolution based on a respective learned gating function of the bi-directional LSTM for each resolution;

summing the feature vectors input by the respective learned gating functions for each resolution; and classifying the current sampling point based on the summed input feature vectors for the current sampling point and a memory state of the bi-directional LSTM at the current sampling point.

26. The non-transitory computer readable medium of claim 23, wherein classifying each of the plurality of sampling points along the vessel centerline based on the multi-scale image information generated for the plurality of 2D cross-section image patches using the trained RNN comprises, for each of the plurality of sampling points along the vessel centerline:

encoding each of multiple reduced resolution image patches generated for the 2D cross-section image patch extracted at a current sampling point into a respective feature vector for each resolution using a respective trained convolutional neural network (CNN) for each resolution;

inputting the encoded feature vector for each resolution to a respective trained long short-term memory (LSTM) network for each resolution; and sequentially performing classification of the current sample point by the respective trained LSTM for each resolution, starting with a lowest resolution level LSTM, wherein an output of each LSTM other than a highest resolution level LSTM is input to a subsequent LSTM at a next resolution level and the highest resolution level LSTM outputs a classification result for the current sampling point.

* * * * *